(12) United States Patent
Sekine et al.

(10) Patent No.: US 7,266,356 B2
(45) Date of Patent: Sep. 4, 2007

(54) MOBILE COMMUNICATION TERMINAL APPARATUS AND MOBILE COMMUNICATION METHOD

(75) Inventors: Shuichi Sekine, Yokohama (JP); Takayoshi Ito, Yokohama (JP); Ryoko Matsuo, Tokyo (JP); Hiroki Shoki, Kawasaki (JP); Yutaka Asanuma, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 503 days.

(21) Appl. No.: 10/751,497

(22) Filed: Jan. 6, 2004

(65) Prior Publication Data

US 2004/0192416 A1    Sep. 30, 2004

(30) Foreign Application Priority Data

Jan. 9, 2003   (JP) .............................. 2003-003289

(51) Int. Cl.
*H04B 1/06* (2006.01)
(52) U.S. Cl. ...................... 455/276.1; 455/68; 455/69; 455/304
(58) Field of Classification Search ............. 455/575.7, 455/447, 260, 276.1, 304, 25, 63.4, 68, 69
See application file for complete search history.

(56) References Cited

U.S. PATENT DOCUMENTS 6,643,337 B1 * 11/2003 Pierce ......................... 375/343
6,650,692 B2 * 11/2003 Inoue et al. ................. 375/147
2002/0168036 A1 * 11/2002 Kim ........................... 375/343
2003/0129985 A1 * 7/2003 Naden et al. ................ 455/447
2003/0186725 A1 * 10/2003 Miya et al. .................. 455/561
2004/0246889 A1 * 12/2004 Ogawa et al. ............... 370/210

FOREIGN PATENT DOCUMENTS

JP    2001-189971    7/2001

OTHER PUBLICATIONS

U.S. Appl. No. 10/751,497, filed Jan. 6, 2004, Sekine et al.
U.S. Appl. No. 11/411,854, filed Apr. 27, 2006, Shoki et al.
U.S. Appl. No. 10/423,946, filed Apr. 28, 2003, Matsuo et al.

(Continued)

*Primary Examiner*—Nay Maung
*Assistant Examiner*—Dominic E. Rego
(74) *Attorney, Agent, or Firm*—Oblon, Spivak, McClelland, Maier & Neustadt, P.C.

(57) ABSTRACT

A mobile communication terminal apparatus includes an antenna unit configured to select antenna radiation characteristics, and receives a first signal transmitted from transmitting station according to the selected antenna radiation characteristic, a transmitter which transmits a detection signal to other terminals, the designation signal generated from the first signal, for designating the antenna radiation characteristics, a first receiver which receives another designation signal from the other terminal apparatuses, a controller which controls the antenna unit to obtain the antenna radiation characteristics designated by the another designation signal, a second receiver which receives second signal that is transferred from the other terminal apparatuses and is obtained by the antenna radiation characteristics selected by the other terminal apparatuses, and a processor which processes the second signal and the detection signal in a diversity scheme.

9 Claims, 6 Drawing Sheets

OTHER PUBLICATIONS

U.S. Appl. No. 10/422,699, filed Apr. 25, 2003, Sekine et al.
U.S. Appl. No. 10/440,114, filed May 19, 2003, Aoki et al.
U.S. Appl. No. 10/440,115, filed May 19, 2003, Sakata et al.
U.S. Appl. No. 10/737,762, filed Dec. 18, 2003, Shoki et al.
U.S. Appl. No. 10/721,466, filed Nov. 26, 2003, Matsuo et al.
U.S. Appl. No. 10/751,497, filed Jan. 6, 2004, Sekine et al.

* cited by examiner

|     | #1a | #1b | #2a | #2b | #3a | #3b | #4a | #4b |
| --- | --- | --- | --- | --- | --- | --- | --- | --- |
| #1a | –   | O   | △   | O   | O   | O   | O   | O   |
| #1b | –   | –   | O   | △   | O   | O   | O   | O   |
| #2a | –   | –   | –   | △   | △   | △   | △   | △   |
| #2b | –   | –   | –   | –   | △   | △   | △   | △   |
| #3a | –   | –   | –   | –   | –   | O   | △   | O   |
| #3b | –   | –   | –   | –   | –   | –   | O   | △   |
| #4a | –   | –   | –   | –   | –   | –   | –   | △   |
| #4b | –   | –   | –   | –   | –   | –   | –   | –   |

O : Terminal #1 is in charge
△ : Terminal #2 is in charge

FIG. 7

|     | #1a | #1b | #2a | #2b | #3a | #3b | #4a | #4b |
| --- | --- | --- | --- | --- | --- | --- | --- | --- |
| #1a | –   | O   | △   | O   | ×   | O   | □   | O   |
| #1b | –   | –   | O   | △   | O   | ×   | O   | □   |
| #2a | –   | –   | –   | △   | ×   | △   | □   | △   |
| #2b | –   | –   | –   | –   | △   | ×   | △   | □   |
| #3a | –   | –   | –   | –   | –   | ×   | □   | ×   |
| #3b | –   | –   | –   | –   | –   | –   | ×   | □   |
| #4a | –   | –   | –   | –   | –   | –   | –   | □   |
| #4b | –   | –   | –   | –   | –   | –   | –   | –   |

O : Terminal #1 is in charge
△ : Terminal #2 is in charge
× : Terminal #3 is in charge
□ : Terminal #4 is in charge

MOBILE COMMUNICATION TERMINAL APPARATUS AND MOBILE COMMUNICATION METHOD

CROSS-REFERENCE TO RELATED APPLICATIONS

This application is based upon and claims the benefit of priority from the prior Japanese Patent Application No. 2003-003289, filed Jan. 9, 2003, the entire contents of which are incorporated herein by reference.

BACKGROUND OF THE INVENTION

1. Field of the Invention

This invention relates to a mobile communication terminal apparatus and mobile communication method capable of diversity reception in cooperation with the other terminal.

2. Description of the Related Art

A technique of allowing a plurality of mobile stations receiving a signal transmitted from a base station of a mobile communication system such as a cellular mobile communication system to cooperate with each other to perform diversity reception, has been known (see, for example, Document 1: Jpn. Pat. Appln. KOKAI Publication No. 2001-189971).

The technique of Document 1 allows the mobile stations to directly transfer signals which they receive from the base station, respectively, to each other via an ad hoc network. Each of the mobile stations performs diversity reception by synthesizing the signals received by the mobile stations.

According to the technique of Document 1, a plurality of antennas can be greatly spaced from each other to obtain a signal used for the diversity reception, and generally a great diversity gain can be obtained.

Incidentally, if the mobile station is capable of changing the antenna radiation characteristic, the antenna radiation characteristic is selected originally by each mobile station. For this reason, the diversity effect may not be sufficiently achieved in accordance with the state of the antenna radiation characteristic of each of a plurality of antennas used to obtain the signal utilized for the diversity reception.

BRIEF SUMMARY OF THE INVENTION

The present invention has been accomplished in consideration of such a circumstance, and the object of the present invention is to effectively perform the diversity reception.

According to an aspect of the present invention, there is provided a mobile communication terminal apparatus to communicate with a transmitting station together with other terminal apparatuses, comprising: an antenna unit configured to select at least one of a plurality of antenna radiation characteristics different from one another, and receive a signal transmitted from the transmitting station according to the selected one of the antenna radiation characteristics, to generate a first signal; a transmitter which transmits a detection signal to the other terminal apparatuses, the designation signal generated from the first signal, for designating the antenna radiation characteristics; a first receiver which receives another designation signal from the other terminal apparatuses; a controller which controls the antenna unit to obtain the antenna radiation characteristic designated by the another designation signal; a second receiver which receives a second signal that is transferred from one of the other terminal apparatuses and is obtained by the antenna radiation characteristics selected by the other terminal apparatuses; and a processor which processes the second signal and the detection signal in a diversity scheme.

According to another aspect of the present invention, there is provided a mobile communication terminal apparatus to communicate with a transmitting station together with other terminal apparatuses, comprising: an antenna unit configured to select at least one of a plurality of antenna radiation characteristics different from one another, and receive a signal transmitted from the transmitting station according to the selected one of the antenna radiation characteristics, to generate a first signal; a wave detector which detects the first signal to output a detection signal; a receiver which receives a signal which is transmitted from the other terminal apparatuses and represents the detection signal, to generate a reference signal; an operator which operates a correlation value between the reference signal, and the detection signal of the selected antenna radiation characteristic at the time of selecting the antenna radiation characteristic; a determination device configured to determine first antenna radiation characteristics of the other terminal apparatuses and second antenna radiation characteristics to be set at the antenna unit, based on the correlation value; a first transmitter which transmits a designation signal for designating the first antenna radiation characteristics, to the other terminal apparatuses; a controller which controls the antenna unit to obtain the second antenna radiation characteristics; and a second transmitter which transmits the detection signal to the other terminal apparatuses, when the antenna unit has the second antenna radiation characteristics.

According to another aspect of the present invention, there is provided a mobile communication method comprising: receiving a signal transmitted from a transmitting station by an antenna unit that selects at least one of a plurality of antenna radiation characteristics different from each other, to obtain a first signal; detecting the first signal to output a detection signal; transmitting the detection signal to other terminals as a designation signal to designate the antenna radiation characteristic at the time of selecting the antenna radiation characteristics; receiving another designation signal from the other terminal apparatuses; setting the antenna unit at the antenna radiation characteristics designated by the another designation signal; receiving a second signal that is transferred from the other terminal apparatuses and is obtained by the antenna radiation characteristics selected by the other terminal apparatuses; and processing the second signal and the detection signal in a diversity scheme.

According to yet another aspect of the present invention, there is provided a mobile communication method comprising: receiving a first signal transmitted from a transmitting station by an antenna unit that selects at least one of a plurality of antenna radiation characteristics different from one another; detecting the first signal to output a detection signal; receiving a reference signal which is transmitted from other terminals and represents the detection signal; operating a correlation value between the reference signal, and the detection signal of the selected antenna radiation characteristics at the time of changing the antenna radiation characteristic; determining first antenna radiation characteristics of the other terminal apparatuses and second antenna radiation characteristics to be set at the antenna unit, based on the correlation value; transmitting a designation signal to designate the first antenna radiation characteristics, to the other terminal apparatuses; controlling the antenna unit to obtain the second antenna radiation characteristics; and transmitting the detection signal to the other terminal apparatuses, when the antenna unit has the second antenna radiation characteristics.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the drawings.

Figure 1:
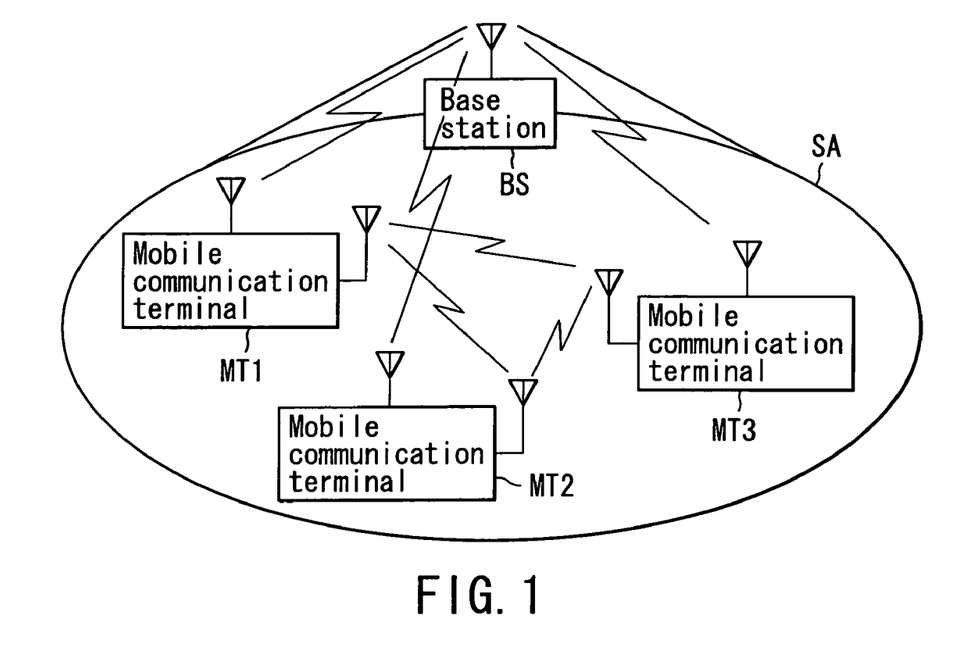
FIG. 1 is a block diagram showing a structure of a mobile communication system according to a embodiment of the present invention.

FIG. 1 shows a summary of a mobile communication system to which the present invention is applied.

In FIG. 1, a base station BS belongs to a certain mobile communication network. The base station BS forms a service area SA. The base station BS makes radio communication with mobile communication terminals MT1, MT2 and MT3 that are positioned in the range of the service area SA. Thus, the mobile communication terminals MT1, MT2 and MT3 can make communication through a network utilizing the base station BS. Each of the mobile communication terminals MT1, MT2 and MT3 has a function of making communication through the ad hoc network and they can make communication directly with each other without the base station BS.

A wireless LAN in accordance with IEEE 802.11 or the like is, for example, expected as the network to which the base station BS belongs and Bluetooth (R) is, for example, expected as the radio communication scheme implementing the ad hoc network.

FIRST EMBODIMENT

A first embodiment will be described below.

The first embodiment comprises two types of the mobile communication terminals MT1, MT2 and MT3, i.e. a controlled type and a controlling type. In the following descriptions, the mobile communication terminal MT1 of the controlled type is called a controlled terminal and the mobile communication terminal MT2 of the controlling type is called a controlling terminal.

Figure 2:
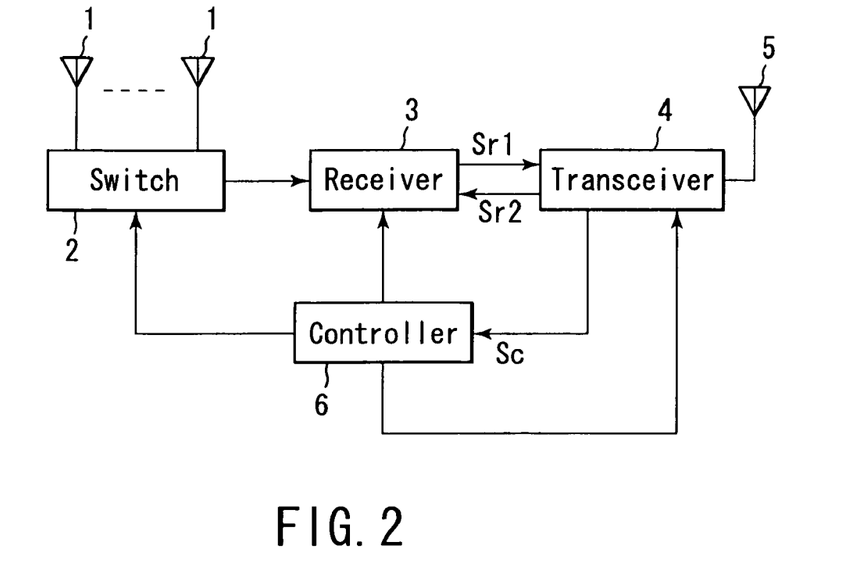
FIG. 2 is a block diagram showing a structure of the controlled terminal of the first embodiment.

FIG. 2 is a block diagram showing a structure of the controlled terminal of the first embodiment.

The controlled terminal comprises a plurality of antennas 1, a switch 2, a receiver 3, a transceiver 4, an antenna 5 and a controller 6.

The antennas 1 receive high-frequency signals transmitted from the base station BS, respectively. The switch 2 selects one of the high-frequency signals that the antennas 1 output respectively, and outputs the selected high-frequency signal to the receiver 3. The antenna 1 selected by the switch 2 is instructed by the controller 6.

The receiver 3 detects the selected high-frequency signal. The receiver 3 has two modes, i.e. a memory mode and a transfer mode. The receiver 3 of the memory mode temporarily stores a detected signal (hereinafter called a detection signal) Sr1 in a memory which is built in the receiver 3 and outputs the signal to the transceiver 4 under the control of the controller 6. The receiver 3 of the transfer mode immediately outputs the detection signal Sr1 to the transceiver 4. The receiver 3 processes the detection signal Sr1 and a transfer signal Sr2 that is output from the transceiver 4, in order to extract a speech signal or an image signal of the base band. The signal transmitted from the base station BS includes a speech signal, an image signal, an information signal such as text data and the like.

The transceiver 4 makes communication with the other mobile communication terminals MT2 and MT3 (hereinafter called the other terminals) through the ad hoc network. The transceiver 4 outputs the detection signal Sr1 to the ad hoc network to transmit the signal to the other terminals as a transfer signal. The signal from the ad hoc network received by the antenna 5 is input to the transceiver 4. The transceiver 4 separates the transfer signal Sr2 from the other terminals and a control signal Sc from the extracted signal. The transceiver 4 outputs the transfer signal Sr2 to the receiver 3 and the control signal Sc to the controller 6. The channel extracted by the transceiver 4 is instructed by the controller 6.

The controller 6 is formed by utilizing, for example, a microprocessor. The controller 6 performs various kinds of processings to totally control the controlled terminal. The controller 6 has a control function to be described later with reference to FIG. 6 and a function of controlling selecting the antenna 1 in response to the instruction from the controlling terminal, in addition to functions of well-known processings to implement various kinds of functions that the mobile communication terminal has.

Incidentally, the structure of the receiver 3 is varied according to the selection scheme or the synthesizing scheme of the reception diversity.

Figure 3:
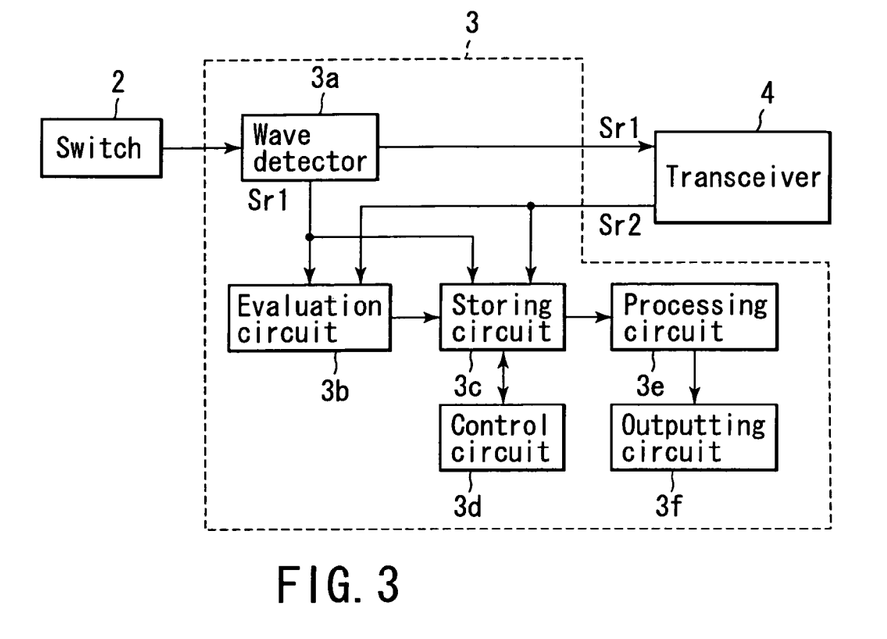
FIG. 3 is a block diagram showing a structure of the receiver 3 of the selection scheme.

FIG. 3 is a block diagram showing a structure of the receiver 3 of the selection scheme.

The receiver 3 comprises a wave detector 3a, an evaluation circuit 3b, a storing circuit 3c, a control circuit 3d, a processing circuit 3e and an outputting circuit 3f.

The wave detector 3a performs the above-described signal detection and outputs the detection signal Sr1.

The detection signal Sr1 and the transfer signal Sr2 are input to the evaluation circuit 3b and the storing circuit 3c, respectively. The evaluation circuit 3b evaluates the quality of the detection signal Sr1 and the quality of the transfer signal Sr2, and outputs evaluation information representing a result of the evaluation to the storing circuit 3c. For example, the evaluation circuit 3b handles a value obtained by adding values of received field intensity of the detection signal Sr1 or the transfer signal Sr2 for a certain period as the evaluation information of each of the signals.

The storing circuit 3c stores the detection signal Sr1 and the transfer signal Sr2, and also stores the evaluation information of the detection signal Sr1 and the evaluation information of the transfer signal Sr2. If the evaluation information is newly output from the evaluation circuit 3b, the storing circuit 3c stores the new evaluation information and outputs a signal indicating a fact that the evaluation is newly completed to the control circuit 3d.

The control circuit 3d compares the evaluation results of the detection signal Sr1 and the transfer signal Sr2 stored in the storing circuit 3c, and selects the detection signal Sr1 or the transfer signal Sr2 having better quality. The control circuit 3d controls the storing circuit 3c to output the selected signal to the processing circuit 3e.

The processing circuit 3e converts the signal which is input from the storing circuit 3c into the initial information data. The outputting circuit 3f outputs the information data which is input from the processing circuit 3e as a speech signal or an image signal.

Figure 4:
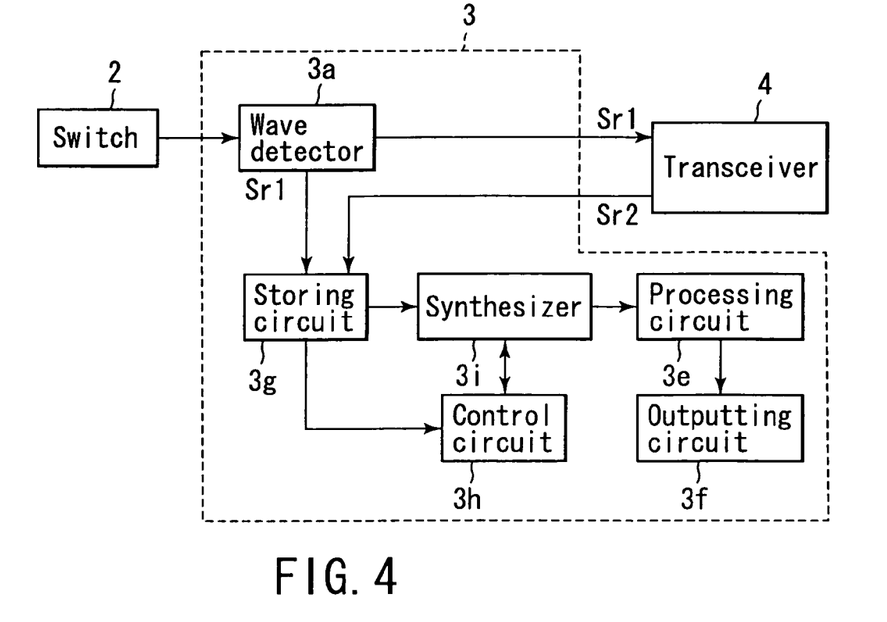
FIG. 4 is a block diagram showing a structure of the receiver 3 of the synthesizing scheme.

FIG. 4 is a block diagram showing a structure of the receiver 3 of the synthesizing scheme.

In the drawing, like portions as shown in FIG. 3 are denoted by like or similar reference numerals and their detailed explanations are omitted here.

The receiver 3 comprises the wave detector 3a, the processing circuit 3e, the outputting circuit 3f, a storing circuit 3g, a control circuit 3h, and a synthesizer 3i.

The detection signal Sr1 and the transfer signal Sr2 are input to the storing circuit 3g. If the detection signal Sr1 is newly transmitted from the receiver 3, the storing circuit 3g notifies the control circuit 3h of this transmission and stores the detection signal Sr1. If the transfer signal Sr2 is transmitted from the transceiver 4, the storing circuit 3g notifies the control circuit 3h of this transmission and stores the transfer signal Sr2.

The control circuit 3h controls storing circuit 3g and the synthesizer 3i to synthesize and add the detection signal Sr1 and the transfer signal Sr2. As for the processing method of the synthesizer 3i, for example, a well-known diversity synthesizing method can be applied. An output signal of the synthesizer 3i is input to the processing circuit 3e. Even in this structure, a signal based on the initial information data can be obtained from the outputting circuit 3f similarly to FIG. 3.

Figure 5:
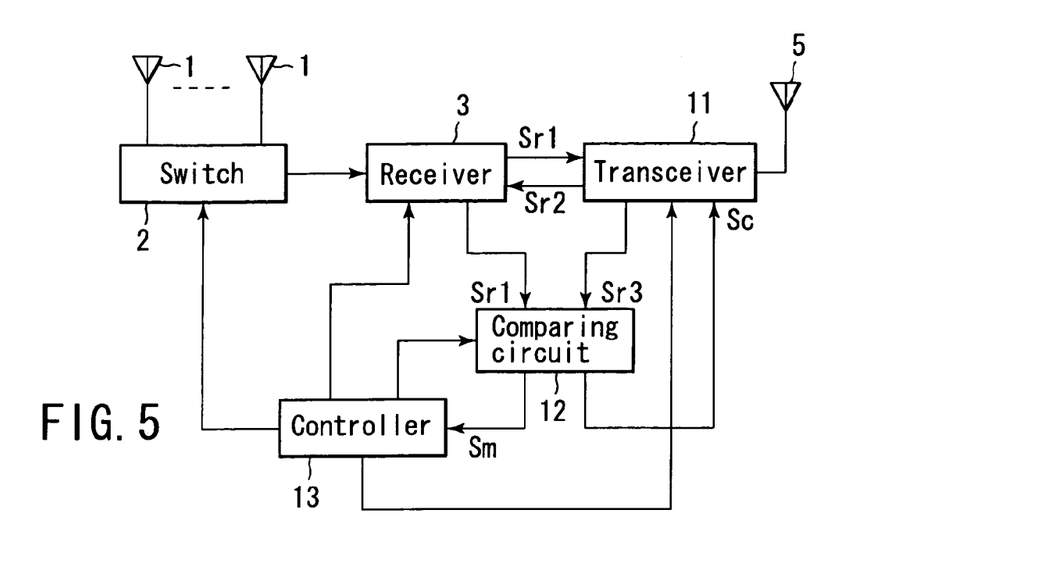
FIG. 5 is a block diagram showing a structure the controlling terminal according to the first embodiment.

FIG. 5 is a block diagram showing a structure of the controlling terminal according to the second embodiment. In the drawing, like portions as shown in FIG. 2 are denoted by like or similar reference numerals and their detailed explanations are omitted here.

The controlling terminal comprises a plurality of antennas 1, the switch 2, the receiver 3, the antenna 5, a transceiver 11, a comparing circuit 12, and a controller 13. In other words, the controlling terminal comprises the transceiver 11 and the controller 13 instead of the transceiver 4 and the controller 6 of the controlled terminal, and further comprises the comparing circuit 12.

The transceiver 11 has substantially the same function as the transceiver 4. However, the transceiver 11 also has a function of transmitting the control signal Sc that is output from the comparing circuit 12 to the other terminals. In addition, the transceiver 11 outputs a reference signal Sr3 that the transceiver 11 receives to the comparing circuit 12.

The comparing circuit 12 generates control signals Sm and Sc on the basis of the detection signal Sr1 that is output from the receiver 3 and the reference signal Sr3 that is output from the transceiver 11. The comparing circuit 12 outputs the control signals Sm and Sc to the controller 13 and the transceiver 11, respectively.

The controller 13 is formed by utilizing, for example, a microprocessor. The controller 13 performs various kinds of processings to totally control the controlling terminal. The controller 13 has a function of controlling generating the control signals Sm and Sc by the comparing circuit 12 and a function of controlling selecting the antenna 1 in response to the control signal Sm, in addition to functions of performing well-known processings to implement various kinds of functions that the existing mobile communication terminal has.

Next, operations of the mobile communication terminals MT1, MT2, and MT3 according to the first embodiment will be explained.

In the first embodiment, one controlled terminal and one controlling terminal, of the mobile communication terminals MT1, MT2, and MT3, are paired to make operations. The paired controlled terminal and controlling terminal cooperate with each other to perform the diversity reception by each terminal.

Figure 6:
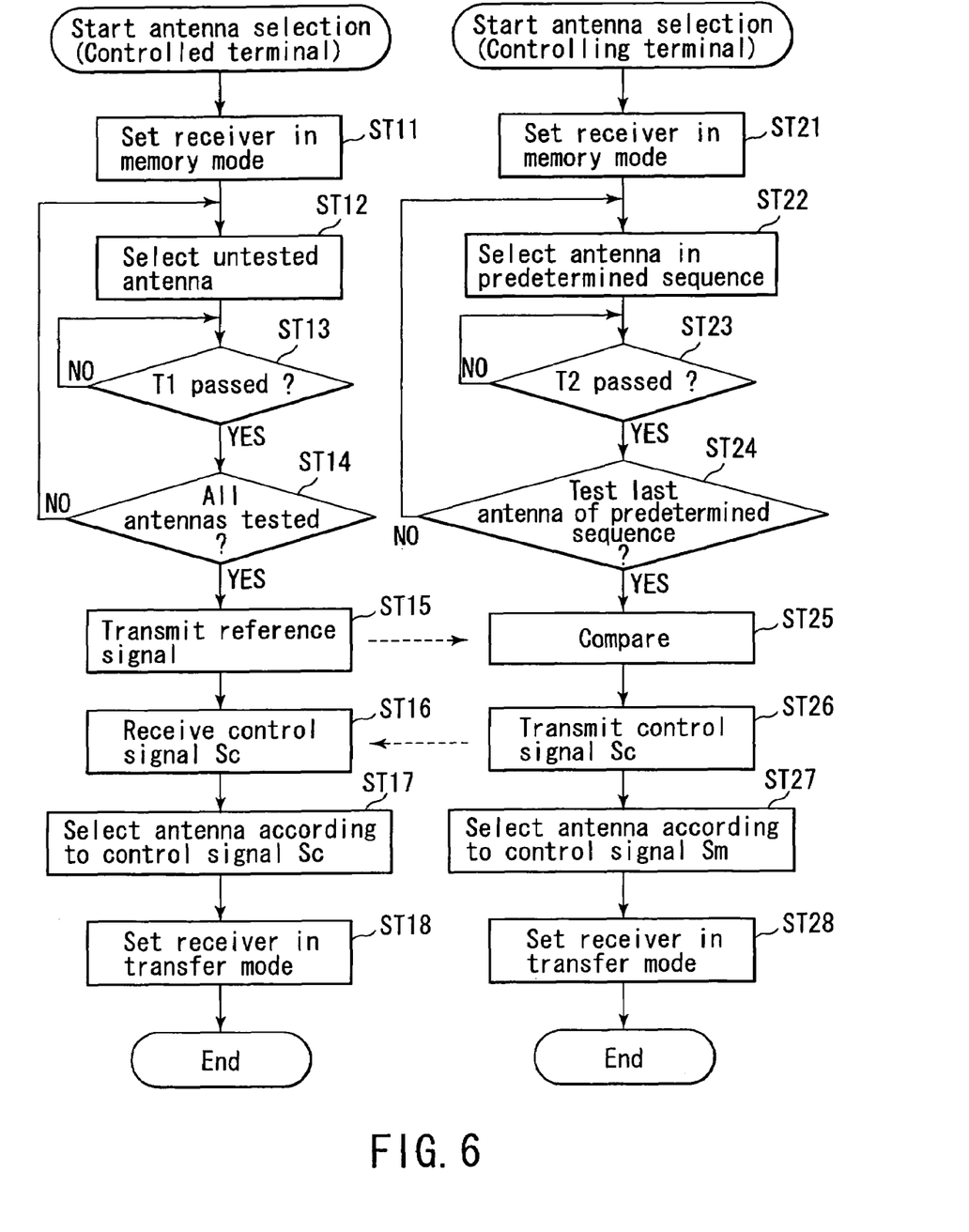
FIG. 6 is a flowchart showing a procedure of the controller 6 of the controlled terminal and the processing of the controller 13 of the controlling terminal, to select the antenna 1.

FIG. 6 is a flow chart showing the processing of the controller 6 of the controlled terminal and the processing of the controller 13 of the controlling terminal, to select the antenna 1.

The controller 6 and the controller 13 simultaneously perform the processings shown in FIG. 6 by taking advantage of a period in which the signal transmitted from the base station BS is a preamble portion.

In the controlled terminal, the controller 6 first sets the receiver 3 in the memory mode at step ST11. Then, the controller 6 controls the switch 2 to select the antenna 1 which has not been utilized for test reception in the current processing, at step ST12. The high-frequency signal which is output from the antenna 1 selected by the switch 2 is input to the receiver 3. At the receiver 3, the high-frequency signal is detected and the detection signal Sr1 is obtained. At this time, the detection signal Sr1 is stored in a memory built in the receiver 3 in order of time series since the receiver 3 is set in the memory mode as explained above.

In this state, the controller 6 waits for a certain time T1 to pass, at step ST13. In other words, the controller 6 makes the receiver 3 store the detection signal Sr1 obtained by utilizing one of the antennas 1 during the time T1. When the time T1 has passed, controller 6 verifies whether or not the test reception is performed with all the antennas 1, at step ST14. If there are the antennas 1 that have not yet been utilized for the test reception, the controller 6 repeats the processings of steps ST12 to ST14.

If the controller 6 verifies that the test reception is ended with all the antennas 1 at step ST14, the controller 6 makes the transceiver 4 transmit the detection signal Sr1 stored in the receiver 3 as a reference signal to the controlling terminal which is to be paired with the controlled terminal at step ST15.

On the other hand, in the controlling terminal, the controller 13 first sets the receiver 3 in the memory mode at step ST21. Then, the controller 13 controls the switch 2 to select one of the antennas 1 in a predetermined order, at step ST22. The high-frequency signal which is output from the antenna 1 selected by the switch 2 is input to the receiver 3. At the receiver 3, the high-frequency signal is detected and the detection signal Sr1 is obtained. At this time, the detection signal Sr1 is stored in a memory built in the receiver 3 in order of time series since the receiver 3 is set in the memory mode as explained above.

In this state, the controller 13 waits for a certain time T2 to pass, at step ST23. In other words, the controller 6 makes the receiver 3 store the detection signal Sr1 obtained by utilizing one of the antennas 1 during the time T2. When the time T2 has passed, controller 6 verifies whether or not the test reception is performed with the last antenna 1 of the order, at step ST24. If the test reception has not been performed with the last antenna 1, the controller 13 repeats the processings of steps ST22 to ST24.

If the controller 13 verifies that the test reception as explained above is ended with the last antenna 1 at step ST24, the controller 13 makes the comparing circuit 12 perform the comparing processing at step ST25. At this time, the controller 13 instructs the comparing circuit 12 to execute the comparing processing and also instructs the transceiver 11 to receive the reference signal transmitted from the controlled terminal as explained above. The controller 13 also instructs the receiver 3 to output the detection signal Sr1 stored in the receiver 3 to the comparing circuit 12. Thus, the reference signal Sr3 obtained by performing the test reception in the controlled terminal and the detection signal Sr1 obtained by performing the test reception in the controlling terminal are fed to the comparing circuit 12. The comparing circuit 12 sequentially compares the reference signal Sr3 and the detection signal Sr1. This comparison is performed by calculating a product of a time series signal of each of the signals and thereby calculating a correlation coefficient.

It is preferable that the reference signal Sr3 and the detection signal Sr1 as compared should be obtained by receiving the same signals from the base station BS at the same time. For this reason, the sequence of the antennas 1 selected in the controlling terminal at the test reception is preliminarily determined by considering the number of the antennas 1 of the controlled terminal and those of the controlling terminal. If the paired terminals are changed, the number of antennas 1 needs to be notified between the controlled terminal and the controlling terminal through the ad hoc network and the sequence of selection of the antennas 1 needs to be determined to implement combination of all the antennas 1.

The comparing circuit 12 discriminates a signal combination having the lowest correlation coefficient, and determines that the antenna 1 corresponding to the reference signal Sr3 in this signal combination should be utilized by the controlled terminal and that the antenna 1 corresponding to the detection signal Sr1 in this signal combination should be utilized by the controlling terminal. The comparing circuit 12 generates the control signal Sc designating the antenna 1 which is determined to be utilized by the controlled terminal and outputs the signal to the transceiver 11. The controller 13 controls the transceiver 11 to transmit the control signal Sc to the controlled terminal at step ST26.

On the other hand, the comparing circuit 12 generates the control signal Sm designating the antenna 1 which is determined to be utilized by the controlling terminal and outputs the signal to the controller 13. The controller 13 controls the switch 2 to select the antenna 1 designated by the control signal Sm at step ST27. Furthermore, the controller 13 sets the receiver 3 in the transfer mode at step ST 28 and terminates the current antenna selection.

When the receiver 3 of the controlling terminal is set in the transfer mode, the receiver 3 immediately outputs the detection signal Sr1 to the transceiver 11. The detection signal Sr1 is transmitted to the controlled terminal via the antenna 5, as a transfer signal, by the transceiver 11. Therefore, the signal obtained by detecting the high-frequency signal received by the antenna 1 which is designated by the control signal Sm becomes being transmitted to the controlled terminal.

If the control signal Sc is transmitted from the controlling terminal as explained above, the controller 6 of the controlled terminal receives the control signal Sc by the transceiver 4 at step ST16. The controller 6 controls the switch 2 to select the antenna 1 which is designated by the control signal Sc, at step ST17. Furthermore, the controller 6 sets the receiver 3 in the transfer mode at step ST 18 and terminates the current antenna selection.

When the receiver 3 of the controlled terminal is set in the transfer mode, the receiver 3 immediately outputs the detection signal Sr1 to the transceiver 4. The detection signal Sr1 is transmitted to the controlling terminal via the antenna 5, as a transfer signal, by the transceiver 4. Therefore, the signal obtained by detecting the high-frequency signal received by the antenna 1 which is designated by the control signal Sc becomes being transmitted to the controlling terminal.

Thus, in the receiver 3 in any of the controlled terminal and the controlling terminal, the processing for the diversity reception is performed with the detection signal obtained by using two antennas determined by the comparing circuit 12, i.e. two antennas having the smallest correlation coefficient. For this reason, communication can be made under better conditions while efficiently obtaining the diversity gain.

SECOND EMBODIMENT

In the above-described first embodiment, one controlled terminal and one controlling terminal are paired. The antenna utilized in each of the mobile communication terminals MT1, MT2, and MT3 can also be determined by discriminating the optimum pairing of antennas in the ad hoc network group in which three or more of mobile communication terminals MT1, MT2, and MT3 exist.

In this case, however, the number of pairings of the antennas increases according to the increase of the mobile communication terminals MT in the group, and the load of the controlling terminal to calculate the correlation coefficient is thereby increased.

In the second embodiment, calculation of the correlation coefficient is dispersed by a plurality of controlling terminals while considering the above matter.

The dispersing method is changed according to the number of the controlled terminals and controlling terminals existing in the ad hoc network group. In this embodiment, four mobile communication terminals MT, i.e. two controlled terminals and two controlling terminals exist in the ad hoc network group. Each of the terminals has two antennas 1.

First, a reference signal obtained by performing the test reception with each of four mobile communication terminals needs to be collected by each of two controlling terminals through the ad hoc network. This reference signal may be colleted by an arbitrary method, but two efficient methods are represented below.

One of them is a method of multiplexing the transmission and reception of the reference signal.

For example, in a case where there are comparatively many reference signals to be handled for the communication through the ad hoc network, much time is required for this communication and problems may thereby occur in the data processing. In this case, the reference signal can be multiplexed to make communication with different frequencies.

If the reference signal can be multiplexed with different frequencies, for example, a controlling terminal #2 can receive the reference signal from a controlled terminal #4 by different frequency channels while a controlling terminal #1 receives the reference signal from a controlled terminal #3. Next, the controlling terminal #2 can receive the reference signal from the controlled terminal #3 by different frequency channels while the controlling terminal #1 receives the reference signal from the controlled terminal #3. Finally, the reference signal is transmitted or received between the controlling terminals #1 and #2. Thus, the controlling terminals #1 and #2 can complete collection of the respective reference signals at three communication times.

Another method uses a broadcast communication function.

Some ad hoc networks have a broadcast communication function called multicast. If the reference signals are comparatively small and a communication time of the reference signals is short enough to cause no troubles in the data processing, all the reference signals can be transmitted or received among the terminals by using the broadcast communication function. For example, the reference signals can be multicast to the terminals #1, #2, #3 and #4 in order.

In the case of the above-described data transmission, adoption of the multiplexing or the broadcast communication can be determined by comparing the magnitude of the reference signals and the bandwidth of the ad hoc network. Furthermore, the order of communication can be determined on the basis of the order of the terminals added to the network at the establishment of the ad hoc network, and the like.

Figure 7:
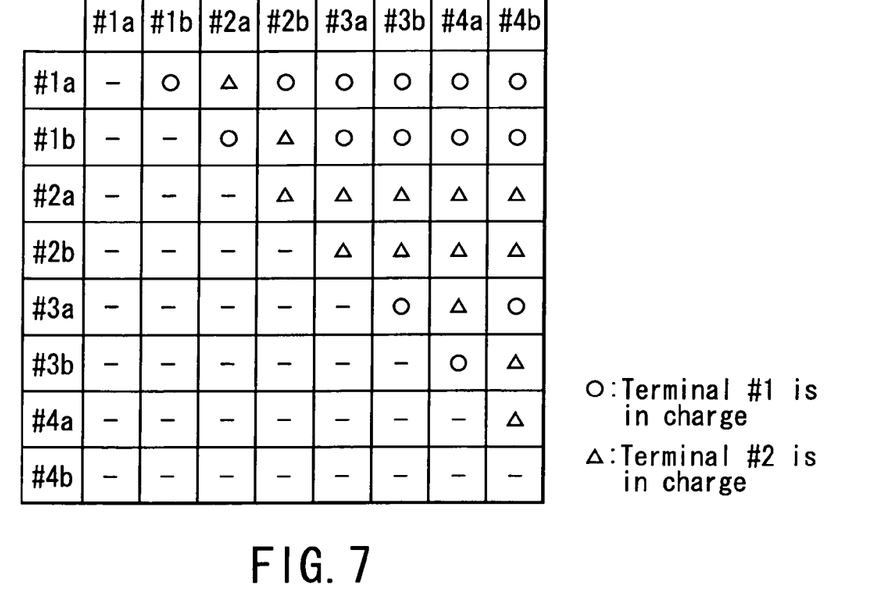
FIG. 7 is a diagram showing a table of sharing of the correlation coefficient calculation.

FIG. 7 shows a table of sharing of the correlation coefficient calculation.

"#1a" and the like represent the antennas 1 existing in the group. For example, "#1a" represents one of the antennas of the terminal #1. Another antenna of the terminal #1 is represented by "#1b". The terminal #1 performs the calculation of the correlation coefficients relating to the pairing represented as ◯ and the terminal #2 performs the calculation of the correlation coefficients relating to the pairing represented as Δ. "-" represents the pairing whose correlation coefficient does not need to be obtained.

Thus, to compare the signals received by the antennas 1 of four mobile communication terminals MT, pairing of totally eight antennas, i.e. comparison of twenty-eight manners is required. In the above example, however, the pairings are shared by two control terminals #1 and #2 such that each of the control terminals calculates the correlation coefficients relating to the pairing of fourteen manners.

By sharing the calculation of the correlation coefficients by two control terminals #1 and #2, the processing can be completed for half of the processing time which is required for the processing centralized by a single control terminal.

The correlation coefficients calculated by each of the controlling terminals #1 and #2 are colleted by a controlling terminal through the ad hoc network. This controlling terminal determines the antenna 1 to be utilized at each of the terminals and a terminal which should serve as a partner of each of the terminals, by considering all the correlation coefficients. The controlling terminal transmits control signals to determine the antenna 1 and the partner to each of the other terminals through the ad hoc network. Determination of the optimum pairing of the antennas can be performed by, for example, selecting the pairing by which the value obtained by summing up the correlation coefficients relating to various kinds of pairing of the antennas 1 is smallest. Otherwise, the optimum pairing may be determined such that the value of the diversity gain presumed from the values of the correlation coefficients is calculated and is made highest.

The controlling terminal performing the processing to determine the antenna 1 which should be utilized at each of the terminals and the terminal which should serve as the partner of each terminal may be fixed to either of the controlling terminals. However, if the controlling terminals #1 and #2 alternately perform the determination, the power required for the data processing can be shared fairly by the controlling terminals. The sequence of this processing may be determined in advance through the ad hoc network.

Figure 8:
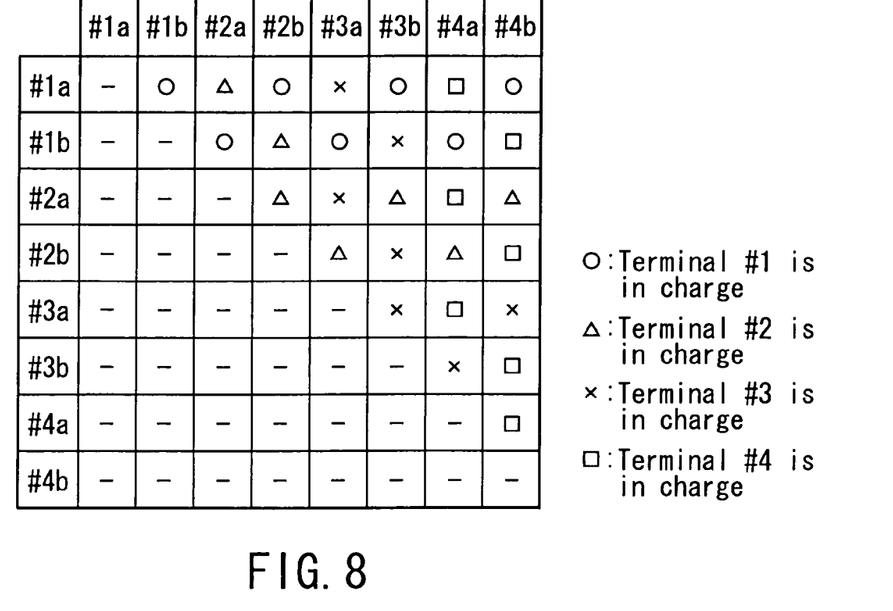
FIG. 8 is a diagram showing another table of sharing of the correlation coefficient calculation.

FIG. 8 shows another table of sharing of the correlation coefficient calculation.

In FIG. 8, all of four existing mobile communication terminals MT are controlling terminals, and the calculation of the correlation coefficients is shared by the four controlling terminals.

Thus, the processing time can be reduced to a quarter by sharing the calculation of the correlation coefficients.

Even if the mobile communication terminals MT have a different number of antennas, the data processing time can be reduced by determining the sharing so that the processing amount of each terminal is as equal as possible, and the power required for the data processing can be further shared fairly.

The sharing of the calculation of the correlation coefficients may arbitrarily be determined in accordance with predetermined rules and conditions of the mobile communication terminals MT existing in the ad hoc network.

According to the second embodiment, as described above, calculation of the correlation coefficients can be performed during a short period. Therefore, the time required to determine the antennas which should be utilized at the respective terminals can be reduced. For this reason, the calculation can follow the rapid variation in propagation atmosphere.

THIRD EMBODIMENT

In the first embodiment described above, the controlling terminal determines only one antenna 1 as the antenna which should be utilized.

For example, however, if there are a plurality of antennas 1 that have correlation coefficients equal to or smaller than a predetermined threshold value, any of these antennas 1 may be determined as the antenna which should be utilized.

In this case, it can be determined at each terminal which of the antennas 1 considered as the antennas which should be utilized is selected.

Figure 9:
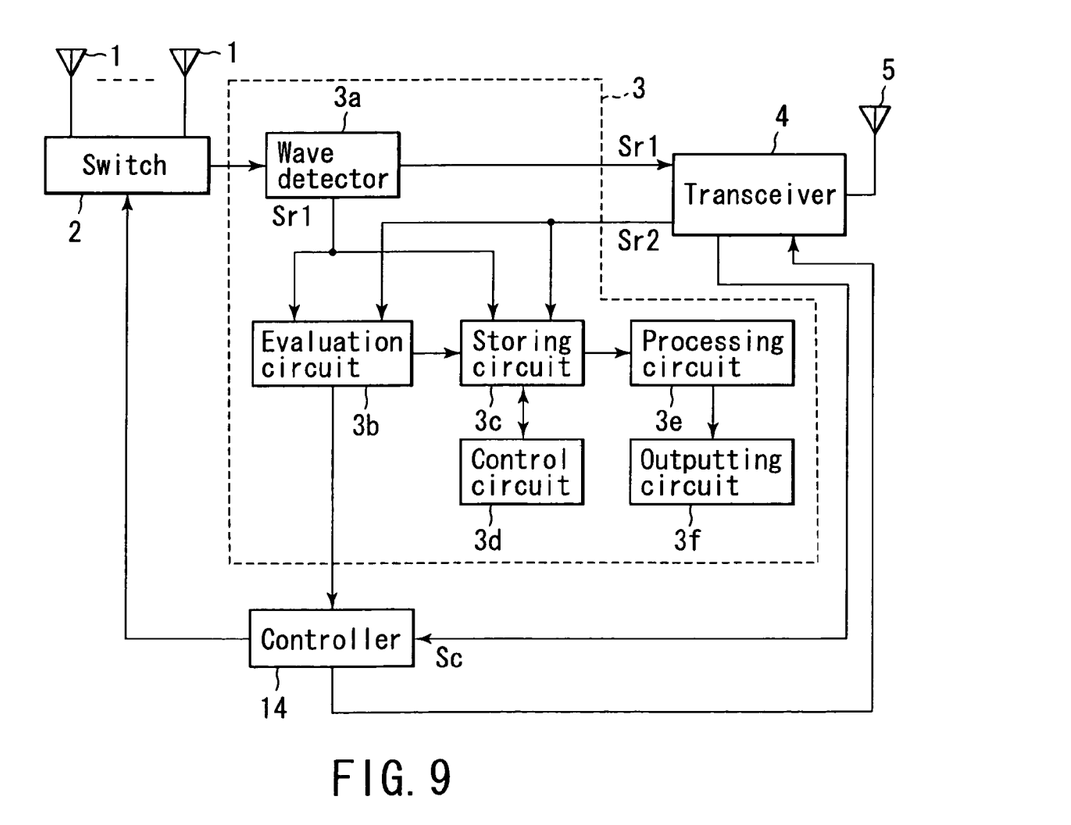
FIG. 9 is a block diagram showing a structure of the controlled terminal according to the third embodiment.

FIG. 9 is a block diagram showing a structure of the controlled terminal according to the third embodiment. In the drawing, like portions as shown in FIG. 2 are denoted by like or similar reference numerals and their detailed explanations are omitted here.

The controlled terminal of the third embodiment comprises a plurality of antennas 1, the switch 2, the receiver 3, the transceiver 4, the antenna 5, and a controller 14 as shown in FIG. 9. In other words, the controlled terminal of the third embodiment comprises the controller 14 instead of the controller 6 in the controlled terminal of the first embodiment.

The controller 14 is formed of, for example, a microprocessor. The controller 14 has substantially the same function as that of the controller 6. However, when a plurality of antennas 1 are selected in accordance with the control signal Sc, the controller 14 selects one of the antennas 1 on the basis of an evaluation result of the evaluation circuit 3b.

Thus, in the third embodiment, the controller 14 selects the antenna 1 from which the highest quality can be obtained, of the antennas designated by the controlling terminal as explained above.

As the reception is performed with the antenna 1 from which the highest quality can be obtained, of the antennas 1 having a small correlation coefficient, the communication can be further made under good conditions.

The characteristic structure of the third embodiment can also be applied to the controlling terminal.

FOURTH EMBODIMENT

Figure 10:
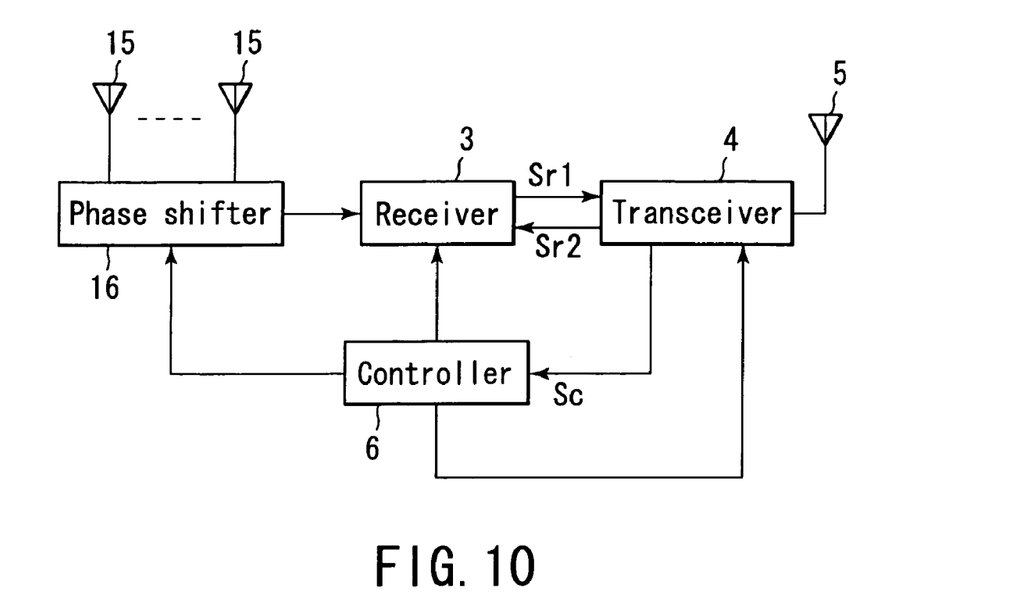
FIG. 10 is a block diagram showing a structure of a controlled terminal according to the fourth embodiment.

FIG. 10 is a block diagram showing a structure of a controlled terminal according to the fourth embodiment. In the drawing, like portions as shown in FIG. 2 are denoted by like or similar reference numerals and their detailed explanations are omitted here.

The controlled terminal of the fourth embodiment comprises the receiver 3, the transceiver 4, the antenna 5, a plurality of antenna devices 15, a phase shifter 16, and a controller 17 as shown in FIG. 10. In other words, the controlled terminal of the fourth embodiment comprises the antenna devices 15, the phase shifter 16 and the controller 17 instead of the antennas 1, the switch 2 and the controller 6 in the controlled terminal of the first embodiment.

The plural antenna devices 15 are aligned two-dimensionally to form an array antenna. The phase shifter 16 varies a phase of the array antenna.

The controller 17 is formed of, for example, a microprocessor. The controller 17 has substantially the same function as that of the controller 6. However, the controller 17 changes an orienting direction of a beam of the array antenna by controlling the amount of phase shifting of the phase shifter 16.

In the fourth embodiment, the same advantage as that of the first embodiment can be obtained by preparing some beams in advance and selecting the beam in the same manner as the manner of selecting the antenna 1 in the first embodiment.

FIFTH EMBODIMENT

Figure 11:
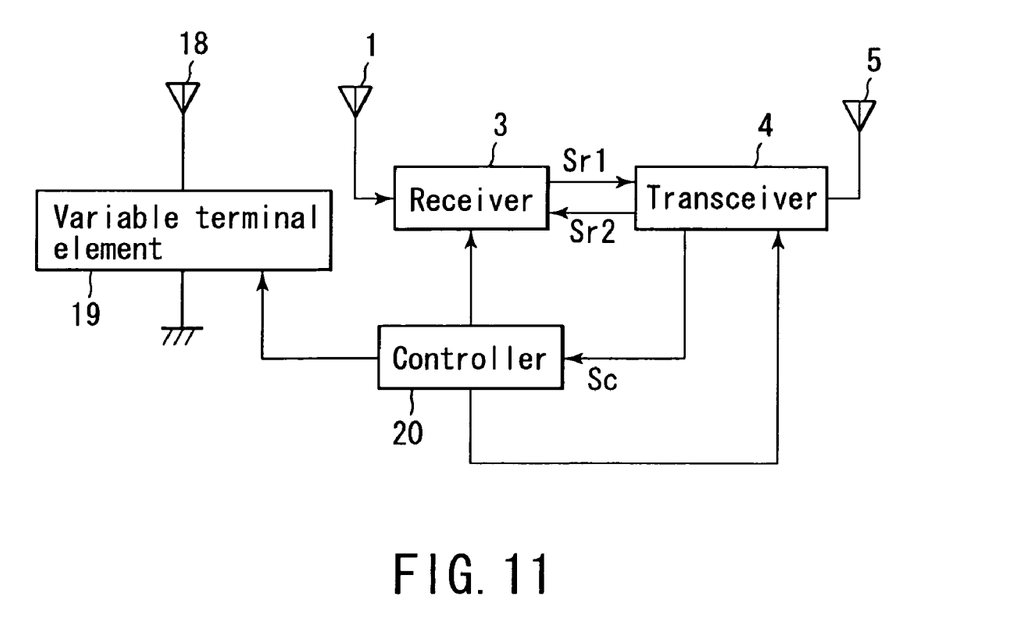
FIG. 11 is a block diagram showing a structure of a controlled terminal according to the fifth embodiment.

FIG. 11 is a block diagram showing a structure of a controlled terminal according to the fifth embodiment. In the drawing, like portions as shown in FIG. 2 are denoted by like or similar reference numerals and their detailed explanations are omitted here.

The controlled terminal of the fifth embodiment comprises the single antenna 1, the receiver 3, the transceiver 4, the antenna 5, a passive element 18, a variable terminal element 19, and a controller 20 as shown in FIG. 11. In other words, the controlled terminal of the fifth embodiment comprises the passive element 18 and the variable terminal element 19 while limiting the antennas 1 in the controlled terminal of the first embodiment to the single antenna 1 and omitting the switch 2. The controlled terminal also comprises the controller 20 instead of the controller 6.

The passive element 18 is arranged in the vicinity of the antenna 1. The variable terminal element 19 is provided in a short circuit between the passive element 18 and a bottom board.

The controller 20 is formed of, for example, a microprocessor. The controller 20 has substantially the same function as that of the controller 6. However, the controller 20 varies the radiation characteristics (radiation pattern and the gain) of the antenna 1 by varying the value of the variable terminal element 19.

In the fifth embodiment, the same advantage as that of the first embodiment can be obtained by preparing in advance some values of the variable terminal element 19 and selecting the value of the variable terminal element 19 in the same manner as the manner of selecting the antenna 1 in the first embodiment. The value of the variable terminal element 19 is determined in advance by preliminarily confirming the variation in the radiation field of the antenna 1 such that, for example, the radiation field changes as much as possible.

The present invention is not limited to the embodiments described above. For example, the receiver 3 may detect the signal transmitted from the transmission station other than the base station BS.

The present invention can also be applied to a case of performing the processing for the diversity reception by using the transfer signal transmitted from the other plural terminals.

The present invention can be modified in various manners without departing from the gist of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal apparatus configured to communicate with a transmitting station together with other terminal apparatuses, comprising:
   an antenna unit configured to select at least one of a plurality of antenna radiation characteristics different from one another, to receive a signal transmitted from the transmitting station according to the selected antenna radiation characteristics, and to generate a first signal;
   a wave detector configured to detect the first signal and to output a detection signal;
   a receiver configured to receive a signal which is transmitted from the other terminal apparatuses and represents the detection signal, and to generate a reference signal;
   an operator configured to determine a correlation value between the reference signal and the detection signal of the selected antenna radiation characteristic at the time of selecting the antenna radiation characteristic;

a determination device configured to determine first antenna radiation characteristics of the other terminal apparatuses and second antenna radiation characteristics to be set at the antenna unit, based on the correlation value;

a first transmitter configured to transmit a designation signal, for designating the first antenna radiation characteristics, to the other terminal apparatuses;

a controller configured to control the antenna unit and to obtain the second antenna radiation characteristics; and a second transmitter configured to transmit the detection signal to the other terminal apparatuses, when the antenna unit has the second antenna radiation characteristics.

2. The terminal apparatus according to claim 1, wherein the determination device is configured to determine the plurality of antenna radiation characteristics as the first antenna radiation charateristics and the second antenna radiation characteristics, when there are a plurality of antenna radiation characteristics satisfying a given first condition; and the controller is configured to control the antenna unit to select one of the plurality of second antenna radiation characteristics under a se6ond condition different from the first condition, and to set the selected second antenna radiation characteristic at the antenna unit, when there are aplurality of second antenna radiation characteristics.

3. The terminal apparatus according to claim 1, further comprising:

a second receiver configured to receive a signal transmitted from the other terminal apparatuses without passing through the transmitting station and obtained by the first antenna radiation characteristics of the other terminal apparatuses, and to generate a second signal; and a processor configured to process the second signal and the detection signal in a diversity scheme.

4. The terminal apparatus according to claim 1, wherein the antenna unit comprises:

a plurality of antenna devices;

a selection device configured to select at least one of the plurality of antenna devices as a selected antenna device; and a change device configured to change the selected antenna device to change over the antenna radiation characteristics.

5. The terminal apparatus according to claim 1, wherein the antenna unit comprises:

a plurality of antenna devices;

a phase shifter configured to shift a phase of output signals of the plurality of antenna devices, and to output a phase shift signal;

a synthesizer configured to synthesize the phase shift signal; and a change device configured to change an amount of the phase shift of the phase shifter to change over the antenna radiation characteristics.

6. The terminal apparatus according to claim 1, wherein the antenna unit comprises:

an antenna device;

a passive element arranged in close vicinity of the antenna device;

a variable terminal element connected to the passive element; and a change device configured to change a value of the variable terminal element to change over the antenna radiation characteristics.

7. A mobile communication method comprising:

receiving a first signal transmitted from a transmitting station by an antenna unit that selects at least one of a plurality of antenna radiation characteristics different from one another;

detecting the first signal to output a detection signal;

receiving a reference signal which is transmitted from other terminals and represents the detection signal;

operating a correlation value between the reference signal and the detection signal of the selected antenna radiation characteristics at the time of changing the antenna radiation characteristic;

determining first antenna radiation characteristics of the other terminal apparatuses and second antenna radiation characteristics to be set at the antenna unit, based on the correlation value;

transmitting a designation signal to designate the first antenna radiation characteristics to the other terminal apparatuses;

controlling the antenna unit to obtain the second antenna radiation characteristics; and transmitting the detection signal to the other terminal apparatuses, when the antenna unit has the second antenna radiation characteristics.

8. The method according to claim 7, wherein the determining step includes determining the plurality of antenna radiation characteristics as the first antenna radiation characteristics and the second antenna radiation characteristics, when there are a plurality of antenna radiation characteristics satisfying a given first condition; and the controlling step includes controlling the antenna unit to select one of the plurality of second antenna radiation characteristics under a second condition, and setting the selected second antenna radiation characteristic at the antenna unit, when there are a plurality of second antenna radiation characteristics.

9. The method according to claim 7, further comprising:

receiving a second signal transmitted from the other terminals without passing through the transmitting station and obtained by the antenna radiation characteristics selected by the other terminal apparatuses; and processing the second signal and the detection signal in a diversity scheme.

* * * * *